Patented Nov. 6, 1934

1,979,601

UNITED STATES PATENT OFFICE 1,979,601

CONVERSION PRODUCTS OF CASEIN

Rudolf Bauer, Cologne - Deutz, and Gustav Mauthe, Cologne-Holweide, Germany, assignors to I. G. Farbenindustrie Aktiengesellschaft, Frankfort-on-the-Main, Germany No Drawing. Application April 17, 1933, Serial 666,633. In Germany May 17, 1932

9 Claims. (Cl. 260—9)

The present invention relates to the manufacture and production of ester-like conversion products of casein and particularly of such ester-like conversion products in which the high molecular state of the original casein is apparently maintained.

It is known that casein shows an amphoteric character, which means that casein may react as a base as well as an acid owing to the presence of basic and acid groups, which latter groups, however, prevail so that casein is easily soluble in alkalies, for example in aqueous ammonia, but difficultly and incompletely in aqueous solutions of organic acids. It is also well known that albumen-bearing substances like casein, keratin or fibroin can be brought into reaction with alkylene oxides, in which reactions, either by the addition of alkali, by the application of heat or by a very extended treatment products are obtained which are soluble in water and aqueous solutions of acids but in which products the original casein is considerably degraded.

We have now found that conversion products of casein, which show a pronounced basic character and apparently possess a high molecular state corresponding about to that of original casein can be obtained by acting on a from neutral to acid aqueous suspension of casein with an alkylene oxide until the product shows an alkaline reaction either as such or after a neutralization of the acid if the reaction be carried out in an aqueous acid solution.

The process according to the present invention may be carried out in a neutral aqueous suspension or a weakly acid aqueous suspension of casein as is obtainable by dispersing casein in an aqueous solution of a water-soluble fatty acid like acetic acid. The alkylene oxides employed for the reaction may be chosen from ethylene oxide, propylene oxide, butylene oxide or glycide or from mixtures of such oxides as are obtainable, for example, by the conversion of commercial mixtures of unsaturated aliphatic hydrocarbons into alkylene oxides. In most cases the lower members of the alkylene oxide series are preferred since they are rather easily available and comparatively cheap. The quantity of ethylene oxide employed for example may be from 10 to 50 per cent by weight of the initial casein and is generally chosen between about 20 and 30 per cent; if other alkylene oxides be employed the quantity employed is preferably altered in accordance with the molecular weight of the alkylene oxide chosen.

The reaction may be carried out at room temperature and can be accelerated by warming to, say, about 90° C. In most cases the reaction temperature will be chosen between about 40 and 80° C.

The products obtained according to the present invention are apparently hydroxy-alkyl esters of casein and show a much higher basic reaction than the initial casein. In contradistinction to the hitherto known reaction products from casein and alkylene oxides they are insoluble in water and weakly alkaline solutions but are soluble in aqueous acid solutions as for example in aqueous acetic acid solutions, and can be precipitated from such acid solutions by the addition of alkali. A dissolution in alkalies is only possible if such quantities of alkali be employed which are considerably higher than those employed for the dissolution of casein or the known degradation products thereof.

The products obtained according to the process of the present invention may find useful application in the production of adhesives and of shaped artificial masses as well as for sizing or finishing purposes in the textile and related industries.

The following examples will further illustrate how the present invention may be carried out in practice but the invention is not restricted thereto. The parts are by weight.

Example 1.—500 parts of commercial casein are stirred in a closed vessel with 2500 parts of water and 125 parts of ethylene oxide at a temperature of 50° C. until the reaction mixture shows an alkaline reaction. The reaction product gradually separated out is filtered off, washed with acetone and ethyl ether and dried. 460 parts of a white powder which is easily soluble in an about 3 per cent aqueous acetic acid solution are obtained.

Example 2.—750 parts of casein are homogeneously mixed with 4000 parts of water and 60 parts of glacial acetic acid. After introducing 400 parts of propylene oxide the whole is heated to from 60 to 70° C. until the product is practically completely precipitated from a sample drawn off after diluting the latter with water and adding ammonia. A completely homogeneous solution is obtained from which the reaction product is precipitated in the form of white flakes by rendering it slightly alkaline by adding ammonia. The solid product is filtered off and can be dissolved in 2700 parts of a 2 per cent aqueous acetic acid solution. About 3500 parts of a 23 per cent highly viscous solution are thus obtained.

*Example 3.*—750 parts of commercial casein are intimately stirred at room temperature with 3700 parts of water and 40 parts of glacial acetic acid. 200 parts of ethylene oxide are then added and the whole is warmed for 4 hours to 60° C. A highly viscous, very weakly acid solution of the product in the aqueous acetic acid is obtained.

We claim:—

1. The process for the manufacture and production of ester-like conversion products of casein, showing a basic reaction and being insoluble in water but soluble in aqueous acid solutions, which comprises acting with an alkylene oxide on an aqueous, from neutral to weakly acid suspension of casein until the product shows an alkaline reaction.

2. The process for the manufacture and production of ester-like conversion products of casein, showing a basic reaction and being insoluble in water but soluble in aqueous acid solutions, which comprises acting with an alkylene oxide at a temperature between about 40° and about 90° C. on an aqueous, from neutral to weakly acid suspension of casein until the product shows an alkaline reaction.

3. The process for the manufacture and production of ester-like conversion products of casein, showing a basic reaction, and being insoluble in water but soluble in aqueous acid solutions, which comprises acting with an alkylene oxide at a temperature between about 40 and about 90° C. on a suspension of casein in an aqueous solution of a water-soluble carboxylic acid until the product shows an alkaline reaction.

4. The process for the manufacture and production of ester-like conversion products of casein, showing a basic reaction and being insoluble in water but soluble in aqueous acid solutions, which comprises acting with ethylene oxide at a temperature between about 40 and about 90° C. on an aqueous, from neutral to weakly acid suspension of casein until the product shows an alkaline reaction.

5. The process for the manufacture and production of ester-like conversion products of casein, showing a basic reaction and being insoluble in water but soluble in aqueous acid solutions, which comprises acting with about 25 parts by weight of ethylene oxide at about 60° on an aqueous suspension of about 100 parts by weight of casein in an aqueous solution of acetic acid until the product shows an alkaline reaction after neutralization of the acetic acid.

6. The process for the manufacture and production of ester-like conversion products of casein, showing a basic reaction and being insoluble in water but soluble in aqueous acid solutions, which comprises acting with propylene oxide at a temperature between about 40 and about 90° C. on an aqueous, from neutral to weakly acid suspension of casein until the product shows an alkaline reaction.

7. Conversion products of casein which are hydroxyl-alkyl esters of casein, show a basic reaction and are insoluble in water but soluble in aqueous acid solutions.

8. Conversion products of casein which are hydroxy-ethyl esters of casein, show a basic reaction and are insoluble in water but soluble in aqueous acid solutions.

9. Conversion products of casein which are hydroxy-propyl esters of casein, show a basic reaction and are insoluble in water but soluble in aqueous acid solutions.

RUDOLF BAUER.
GUSTAV MAUTHE.